Patented Feb. 29, 1944

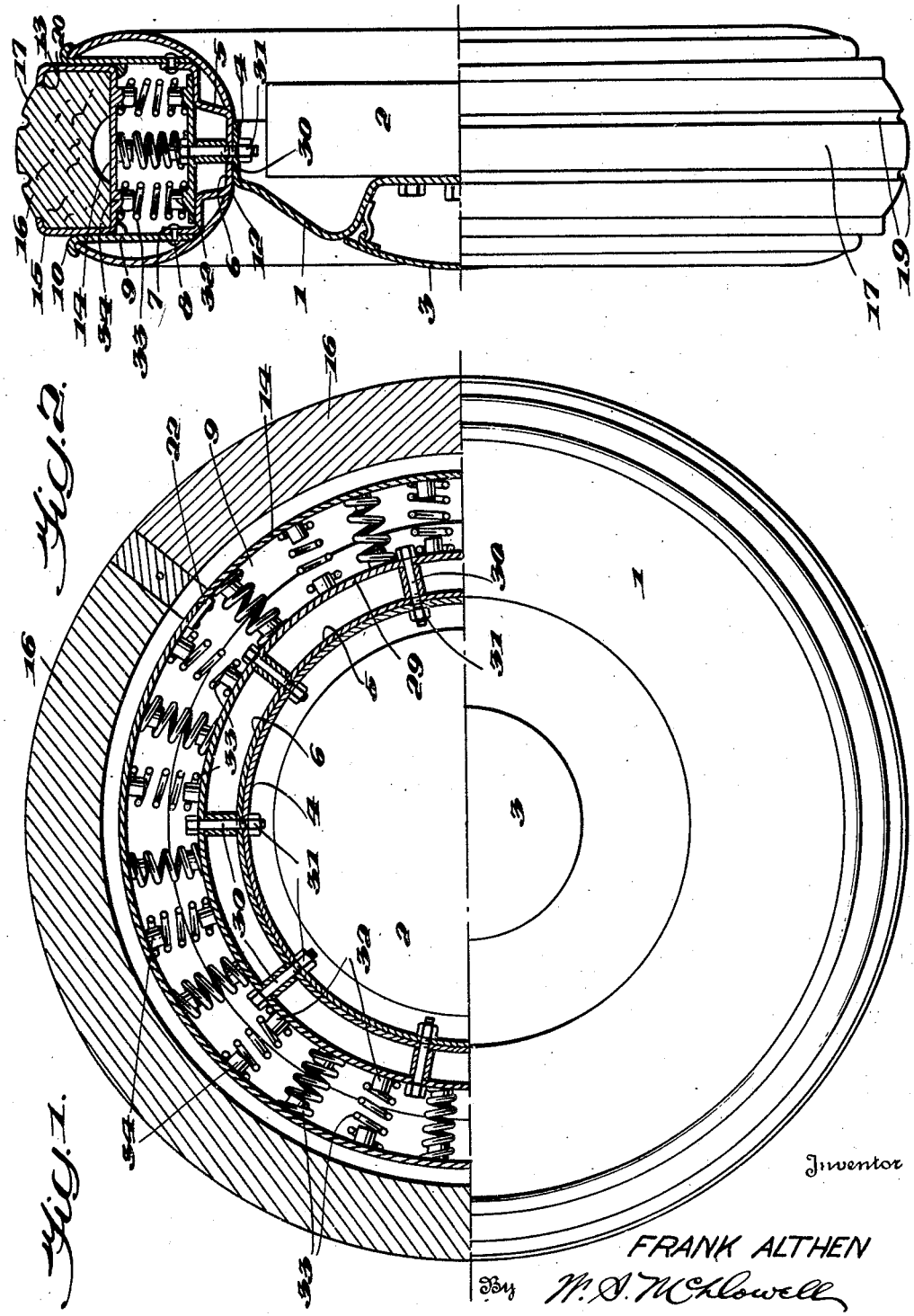

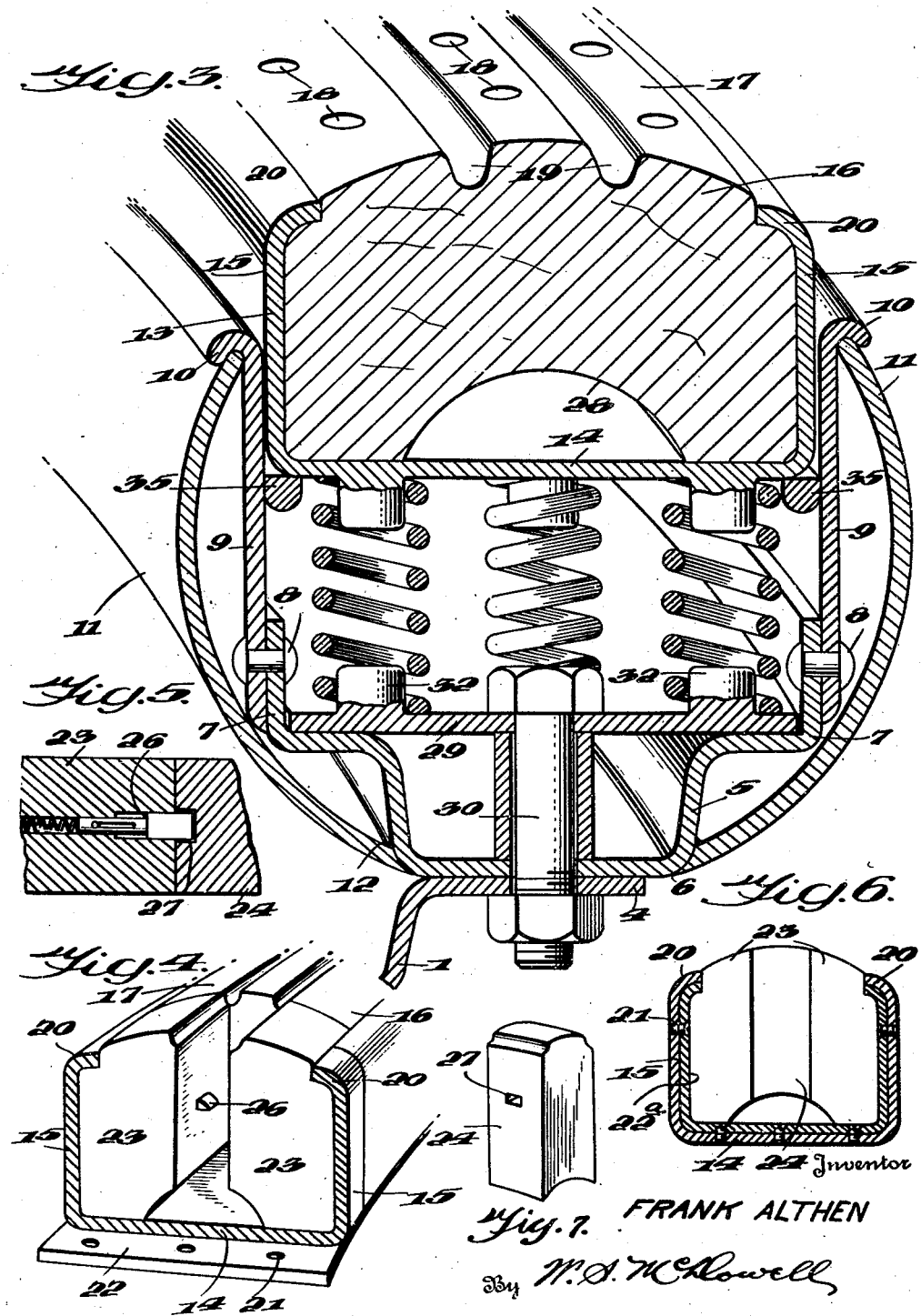

2,342,718

UNITED STATES PATENT OFFICE 2,342,718

RESILIENT WHEEL

Frank Althen, Columbus, Ohio, assignor of one-half to Richard R. Peelle, Columbus, Ohio Application April 6, 1942, Serial No. 437,895

2 Claims. (Cl. 152—105)

This invention is concerned with the provision of an improved wheel for motor vehicles, having particular reference to wheels of the type wherein road shock is absorbed by an arrangement of internally positioned spring devices.

It is the principal object of the invention to provide a serviceable resilient wheel for motor vehicles wherein the construction of the wheel is such as to dispense with the use of customary inflatable rubber tires.

Under present day restrictions on the manufacture and sale of pneumatic tires, motor vehicle operators are confronted with the acute problem of obtaining satisfactory substitutes therefor. The wheel, forming the present invention, provides a construction wherein more readily obtainable materials are employed and one minimizing or eliminating the use of rubber or compositions thereof.

A further object of the invention resides in the provision of a non-inflatable resilient tire structure for motor vehicle wheels, wherein the tire or tread-forming unit is spring actuated and is adapted for convenient application to or association with wheel bodies of conventional construction.

Another object resides in the provision of a motor vehicle wheel which is formed to include a rim casing having a circumferential open-sided channel formed therein, said channel receiving a plurality of radially disposed springs which effect the support of an annular traction-affording ring, the latter being guided by the side walls of the channel so that its resilient movements are confined to the vertical plane of the wheel body.

With these and other objects in view, the invention consists of the novel features of construction, combinations and arrangements of parts as will be hereinafter more fully described and pointed out in the appended claims.

In the accompanying drawings forming a part of this specification, and in which similar characters of reference denote like and corresponding parts throughout the several views thereof:

Fig. 1 is a view partly in front elevation and in vertical section, disclosing the improved resilient wheel forming the present invention;

Fig. 2 is a view, partly in edge elevation and transverse vertical section of my improved vehicle wheel;

Fig. 3 is a transverse vertical sectional view, partly in perspective, showing the internal construction of the wheel on a somewhat enlarged scale;

Fig. 4 is a similar view disclosing the tread filler blocks, the center of said blocks being removed and shown separately at the right of the figure;

Fig. 5 is a detail horizontal sectional view;

Fig. 6 is a detail sectional view showing a modified form of connector chair for the tire rim.

Fig. 7 is a detail perspective view of one of the removable filler blocks.

Referring more particularly to the drawings, the numeral 1 designates the pressed steel body of the improved wheel, the same being formed to receive the standard axle constructions, not shown, of motor vehicles. Connected with the body 1 on the inner side of the wheel is a brake drum 2 and the outside of the body carries the usual detachable hub cap 3. The outer part of the body 1 is formed with a circumferential flange 4 to which is connected a concentric rim casing 5. As an example of one way for constructing the casing, the same has been illustrated as comprising an annular metallic base member 6, which is adapted to be bolted or otherwise secured to the flange 4. Said base member is about the same in its construction as the standard tire-receiving rim of a conventional motor vehicle wheel, except that the sides 7 of the base member are bent upwardly to occupy vertical planes, rather than flaring angularly and outwardly. This construction enables me to utilize in the design of my improved spring tire ordinary tire rims.

To the sides 7 are riveted or otherwise connected, as at 8, a pair of ring-shaped side plates 9. The outer edges of these plates are formed with beaded flanges 10, which snugly receive the outer edges of ornamental trim plates 11. The latter are arcuate in transverse cross section and have their inner edges welded or otherwise secured, as at 12, to the base member 6. By their use, the plates 11 conceal internal structure and contribute to the appearance of the wheel. Additionally, the plates 11 serve to reenforce and strengthen the rim casing.

It will be noted that the construction of the rim casing is such as to provide therein a circumferentially extending chamber which is open at its outer side, being closed on its three remaining sides. Within this chamber, there is positioned a tread assembly. The latter comprises a metallic tread-receiving ring 13 which is formed to include an annular inner wall 14 and spaced vertical side walls 15. The ring 13 possesses substantially the same cross sectional dimensions as the chamber in the rim casing, so that the side plates 9 of said chamber will guidingly receive the side walls 15 of the ring 13, confining the tread assembly for movement only in the vertical plane of the wheel body.

Positioned in the ring 13 is a pair of segmental tread blocks 16 having transverse arcuate crown or road-engaging surfaces 17. These blocks may be formed from a variety of different materials and, in this connection, certain selected woods have been found, such as hard maple or ash, to be entirely satisfactory, although, when available, blocks of rubber or other equivalent compressible or resilient materials may be employed.

To increase their wearing properties, the wood block 16 may have embedded in the road-engaging surfaces 16 thereof, as shown in Fig. 3, a plurality of closely arranged metallic pins 18. Also, the surfaces 17 may be annularly grooved as at 19 for traction facilitating reasons. The outer portions of the side walls 15 of said ring are inwardly flanged as at 20 in order to grip or confine the tread blocks 16 therein.

Preferably, the ring 13 consists of two semicircular sections, the adjoining ends of which may be united as at 21 to connecting plates 22. Before the semicircular sections of the ring are so united, there is inserted in each section one of the segmental tread blocks 16, the contiguous ends of these blocks being sufficiently spaced to enable the screws 21 to be reached in uniting the ring sections. To complete the tread, two sets of filler blocks of the type shown particularly in Fig. 4 are used, which sets are located diametrically opposite each other on the tread assembly.

Each set of filler blocks comprises a pair of side members 23 and a center member 24. When the inner vertical faces 25 of the side members 23 are placed together, the said side members may be inserted into the ring 13 by clearing the flanged edge 20. The side members may then be spread apart so that they will occupy the positions disclosed in Fig. 4. The center filler block 24 is inserted between the side members to fill the space beyond their separation. To hold the center block or member 24 in position, one or both of the side members 23 may be formed with a spring-projected pin 26, the outer end or ends of which being receivable in one or more openings 27 formed in the sides of the center member 24, thereby completing the tread assembly. If desired, the inner surfaces of the several tread blocks may be circularly grooved as at 28 for weight-reducing purposes.

To resiliently support the tread assembly, there is provided in the rim casing a base ring 29. This ring is held in place by means of a plurality of radially extending circumferentially spaced bolts 30, the shanks of these bolts passing through aligned openings provided in the base member 6 and the body flange 4, and the threaded inner ends of said bolts receive binding nuts 31. Projecting outwardly at spaced intervals from the base 29 is a plurality of spring bosses 32, which receive and position the inner ends of a plurality of radially disposed coil springs 33. The outer ends of these springs surround bosses 34 projecting inwardly from the tread ring 13. The springs 33 thus serve to resiliently support the tread assembly, absorb road shock and transmit rotational energy from the wheel axle to the tread assembly.

The annular chamber within the rim casing may receive a suitable lubricant to protect the springs and prolong their life. Also, to seal the spring-receiving chamber, the inner side of the tread ring 13 may be provided with sealing strips or gaskets 35, the latter being so positioned as to wipingly engage the inner surfaces of the side plates 9, the gaskets thus serving to exclude the entrance of moisture, dirt and foreign matter from the spring chamber.

When the tread blocks become worn, new blocks may be substituted therefor. To effect such a substitution, it is necessary merely to chisel out the center members of the filler blocks, then removing the remaining filler blocks so that access to the removable screws 21 may be had. The tread ring may thus be disassembled, facilitating introduction of the new blocks.

In Fig. 6, the connecting plates 22a are channel-shaped and positioned within the adjoining ends of the tread ring sections, providing a strong union between said latter sections. Also, if desired, the ends of the coil springs 33 may engage with fiber washers or the like to prevent direct contact between metallic parts, and for noise minimizing purposes.

In view of the foregoing, it will be seen that the present invention provides a resilient wheel which may be readily applied to or formed on the standard body of a conventional motor vehicle wheel. The annular spring-containing channel formed in the rim casing encloses the springs 33, protecting the same from premature wear or injury and at the same time providing for the guided and resiliently sustained support of the tread assembly, eliminating use of the conventional inflated rubber tires and their attendant disadvantages, such as blowouts, punctures and maintenance costs.

While certain preferred forms of the present invention have been described, nevertheless it will be understood that the construction is subject to considerable modification and variation without departing from the spirit and scope of the invention, as the latter has been defined in the following claims.

I claim:

1. In a non-inflatable resilient tire for vehicle wheels, a tread ring composed of a plurality of segmental sections, each of said sections being substantially channel-shaped in cross section, the upper edges of the side walls of said sections being formed with in-turned flanges, a plurality of arcuate blocks removably positioned in said tread ring sections, detachable connecting plates uniting the adjoining ends of said sections, and a plurality of filler blocks arranged between said arcuate tread blocks, said filler blocks being disposed in registration with said connecting plates.

2. In a non-inflatable resilient tire for vehicle wheels, a tread ring composed of a plurality of segmental sections, each of said sections being substantially channel-shaped in cross section, the upper edges of the side walls of said sections being formed with in-turned flanges, a plurality of arcuate blocks removably positioned in said tread ring sections, detachable connecting plates uniting the adjoining ends of said sections, a plurality of filler blocks arranged between said arcuate tread blocks, said filler blocks being disposed in registration with said connecting plates, and means for interlocking said blocks against relative separation when positioned in said tread ring.

FRANK ALTHEN.